US009552837B2

(12) United States Patent
Do et al.

(10) Patent No.: US 9,552,837 B2
(45) Date of Patent: Jan. 24, 2017

(54) VERTICALLY AND HORIZONTALLY WEAKLY COUPLED PERPENDICULAR SMALL GRAIN MEDIA

(71) Applicant: HGST Netherlands B.V., Amsterdam (NL)

(72) Inventors: Hoa V. Do, Fremont, CA (US); Sylvia H. Florez, San Jose, CA (US); Yoshihiro Ikeda, San Jose, CA (US); Kentaro Takano, San Jose, CA (US); Bruce D. Terris, Sunnyvale, CA (US); Qing Zhu, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 356 days.

(21) Appl. No.: 14/070,408

(22) Filed: Nov. 1, 2013

(65) Prior Publication Data
US 2015/0124350 A1  May 7, 2015

(51) Int. Cl.
*G11B 5/66* (2006.01)
(52) U.S. Cl.
CPC .................................. *G11B 5/66* (2013.01)
(58) Field of Classification Search
CPC .................................. G11B 5/66; G11B 5/667
See application file for complete search history.

(56) References Cited

U.S. PATENT DOCUMENTS

| 5,834,085 | A | 11/1998 | Lairson et al. | |
| 8,110,298 | B1 | 2/2012 | Choe et al. | |
| 8,168,309 | B2 | 5/2012 | Choe et al. | |
| 2002/0037439 | A1* | 3/2002 | Litvinov et al. | 428/694 TM |
| 2008/0144213 | A1* | 6/2008 | Berger et al. | 360/110 |
| 2010/0073813 | A1 | 3/2010 | Dai et al. | |
| 2010/0110576 | A1* | 5/2010 | Akagi et al. | 360/59 |
| 2010/0110584 | A1 | 5/2010 | Dai et al. | |
| 2011/0026161 | A1 | 2/2011 | Ikeda | |

(Continued)

FOREIGN PATENT DOCUMENTS

| WO | WO2010038448 | 4/2010 |
| WO | WO2012047370 | 4/2012 |

OTHER PUBLICATIONS

Hashimoto et al., "Influence of Magnetic Cluster-Size Distribution on Signal-to-Noise Ratio in Perpendicular Magnetic Recording Media", IEEE Trans Magn, vol. 40, No. 4, Jul. 2004, pp. 2458-2460.*

(Continued)

*Primary Examiner* — Holly Rickman
(74) *Attorney, Agent, or Firm* — Zilka-Kotab, PC

(57) ABSTRACT

In one general embodiment, a magnetic medium includes a recording layer having at least three exchange control layers each having a magnetic moment less than 100 emu/cc, and four magnetic layers separated from one another by the exchange control layers. An uppermost of the magnetic layers is doped with oxygen. In another general embodiment, a magnetic medium includes a recording layer having at least three exchange control layers and four magnetic layers separated from one another by the exchange control layers. An uppermost of the magnetic layers has an oxygen content of greater than 0.5 vol %. An average pitch of magnetic grains in a lowermost of the magnetic layers is 9 nm or less. A lowermost of the magnetic layers has an oxide content of at least 20 vol %.

21 Claims, 8 Drawing Sheets

(56) References Cited

U.S. PATENT DOCUMENTS

2013/0071695 A1 3/2013 Peng et al.
2014/0300994 A1* 10/2014 Hong et al. .................. 360/110

OTHER PUBLICATIONS

Gavrila, H., "Coupled Granular/Continuous Media for Perpendicular Magnetic Recording," Proceedings of the Romanian Academy, Series A, vol. 11, No. 1, 2010, pp. 41-46.
Florez et al., "Extraction of short time intrinsic switching field distributions in perpendicular media," Journal of Applied Physics, vol. 111, Issue 7, Feb. 28, 2012, pp. 07B703-1-07B703-3.
Sonobe, Y., et al. "Coupled granular/continuous perpendicular recording media with soft magnetic underlayer," Journal of Applied Physics, vol. 91, Issue 10, May 15, 2002, pp. 8055-8057.
Victoria et al., "Composite Media for Perpendicular Magnetic Recording," Magnetics, IEEE Transactions, vol. 41, Issue 2, Feb. 22, 2005, pp. 537-542.
Wood, R., "The Feasibility of Magnetic Recording at 1 Terabit per Square Inch", Magnetics, IEEE Transactions, vol. 36, Issue 1, Jan. 2000, pp. 36-42.
Zhu, et al., "Noise Mechanisms in Small Grain Size Perpendicular Thin Film Media," Magnetics, IEEE Transactions, vol. 47, Issue 1, Jan. 2011, pp. 74-80.

\* cited by examiner

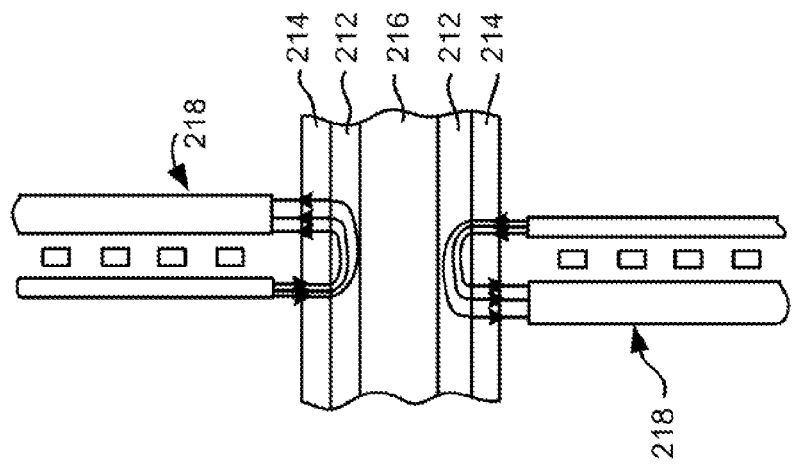
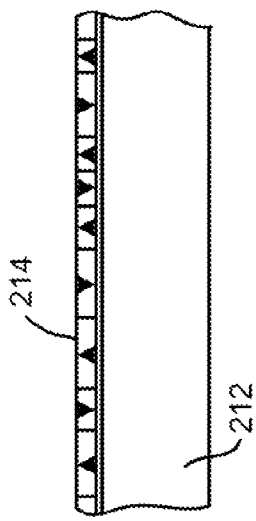
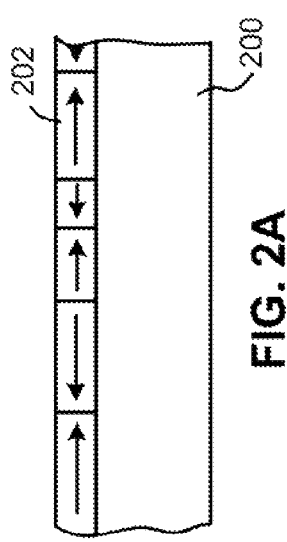
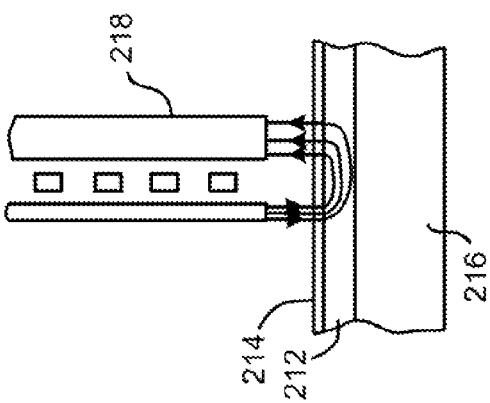
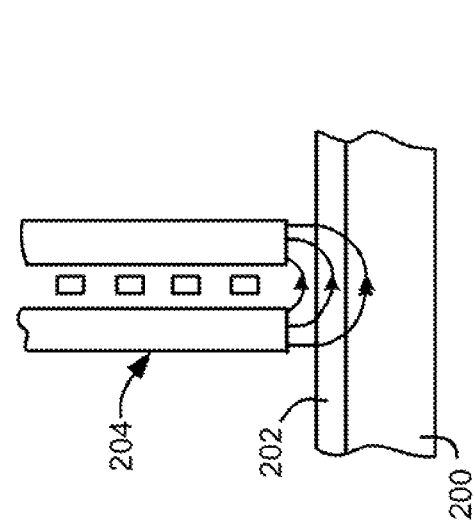

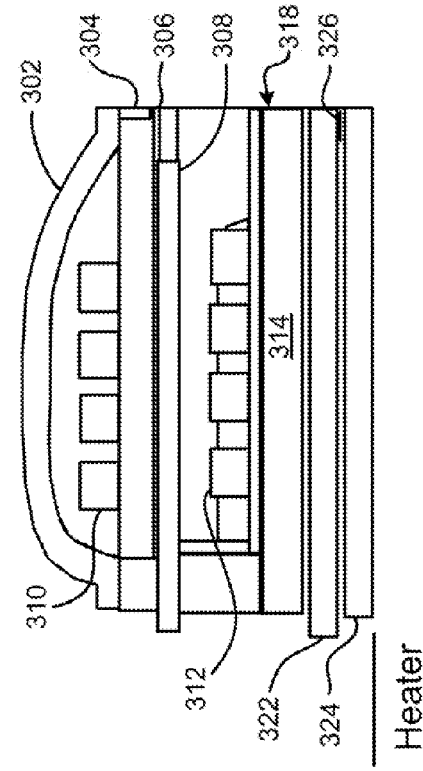
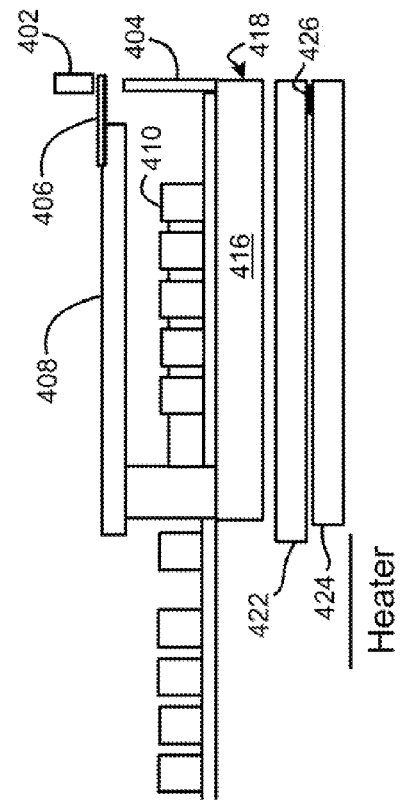
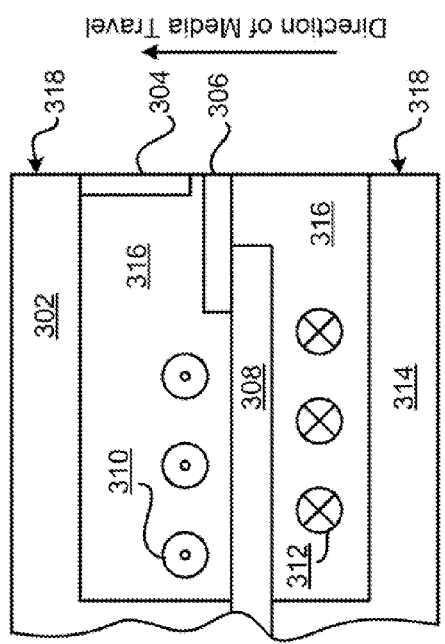
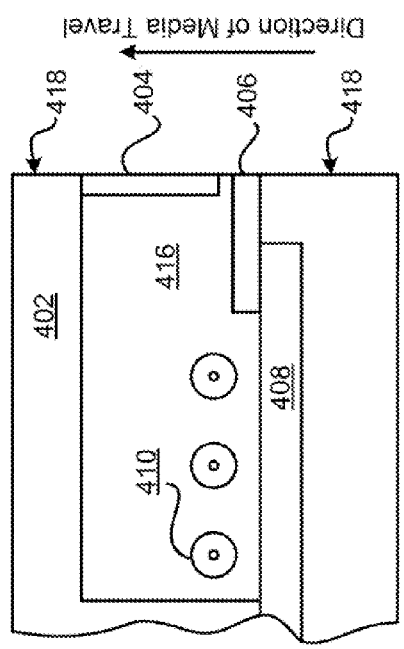

VERTICALLY AND HORIZONTALLY WEAKLY COUPLED PERPENDICULAR SMALL GRAIN MEDIA

FIELD OF THE INVENTION

The present invention relates to data storage systems, and more particularly, this invention relates to magnetic media having reduced magnetic coupling between the magnetic grains of the recording layer and/or the layers thereof.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

However, the further miniaturization of the various components, particularly, the pitch of magnetic grains, presents its own set of challenges and obstacles in conventional products.

Conventional media has vertical exchange between the cap layer and the layers therebelow. The media also includes strong horizontal exchange between each of the grains, particularly near the cap. Grains tend to form clusters of grains that behave magnetically as a single entity. Thus, the achievable areal density is a function not only of grain size, but of cluster size as well.

Attempts to reduce the grain size in such conventional media result in an almost exponential increase to the horizontal exchange between magnetic grains, and therefore increases the cluster size as well. The increase in cluster size reduces the achievable areal density. As a result, conventional products are unable to reduce the grain pitch and/or the grain size of media without greatly sacrificing storage density thereon.

SUMMARY

A magnetic medium according to one embodiment includes a recording layer having at least three exchange control layers each having a magnetic moment less than 100 emu/cc, and four magnetic layers separated from one another by the exchange control layers. An uppermost of the magnetic layers is doped with oxygen.

A magnetic medium according to another embodiment includes a recording layer having at least three exchange control layers and four magnetic layers separated from one another by the exchange control layers. An uppermost of the magnetic layers has an oxygen content of greater than 0.5 vol %. An average pitch of magnetic grains in a lowermost of the magnetic layers is 9 nm or less. A lowermost of the magnetic layers has an oxide content of at least 20 vol %.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods having granular recording layers doped with one or more oxides, and/or exchange coupling layers between granular recording layers, as well as operation and/or component parts thereof. For example, various embodiments herein introduce exchange coupling layers which reduce vertical exchange coupling. Additionally and/or alternatively, oxides may be introduced to the materials of the magnetic grains, thereby reducing the horizontal exchange of the recording layer. As a result, preferred embodiments herein are able to reduce the grain pitch while improving performance of the magnetic medium, e.g., while improving the magnetic stability of the grains. Thus, the storage density of different embodiments herein may be substantially increased.

In one general embodiment, a magnetic medium includes a recording layer having at least three exchange control layers each having a magnetic moment less than 100 emu/cc, and four magnetic layers separated from one another by the exchange control layers. An uppermost of the magnetic layers is doped with oxygen.

In another general embodiment, a magnetic medium includes a recording layer having at least three exchange control layers and four magnetic layers separated from one another by the exchange control layers. An uppermost of the magnetic layers has an oxygen content of greater than 0.5 vol %. An average pitch of magnetic grains in a lowermost of the magnetic layers is 9 nm or less. A lowermost of the magnetic layers has an oxide content of at least 20 vol %.

Figure 1:
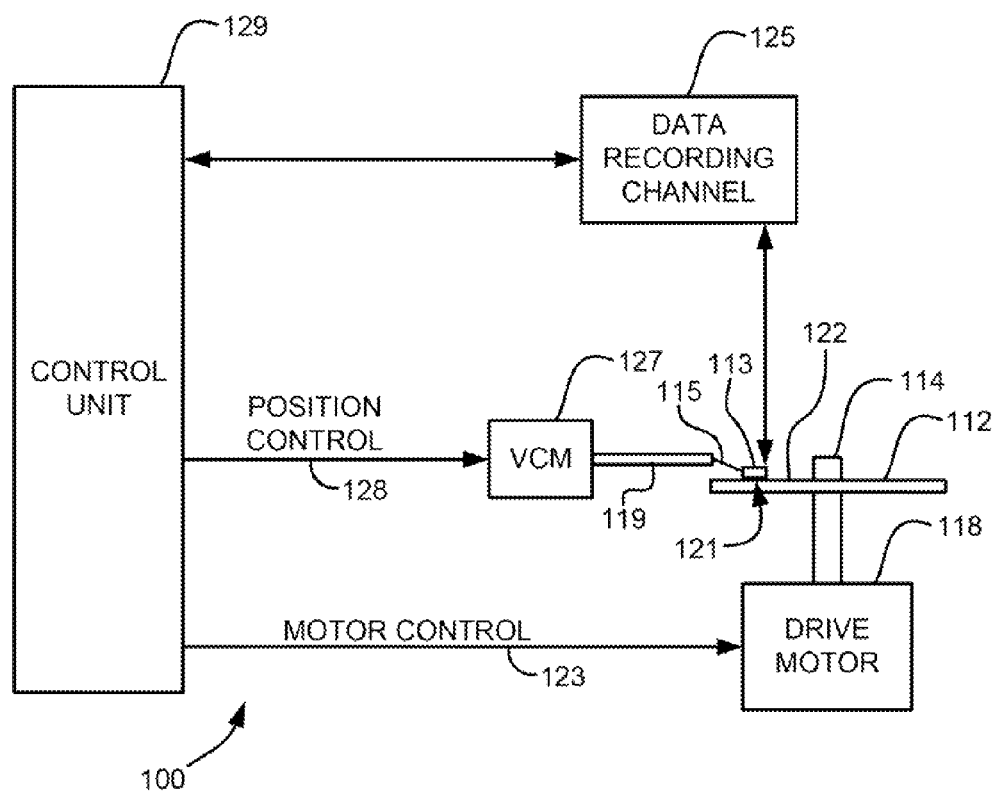
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate current flowing out from the page, while coils 312 indicate current flowing into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

Figure 5:
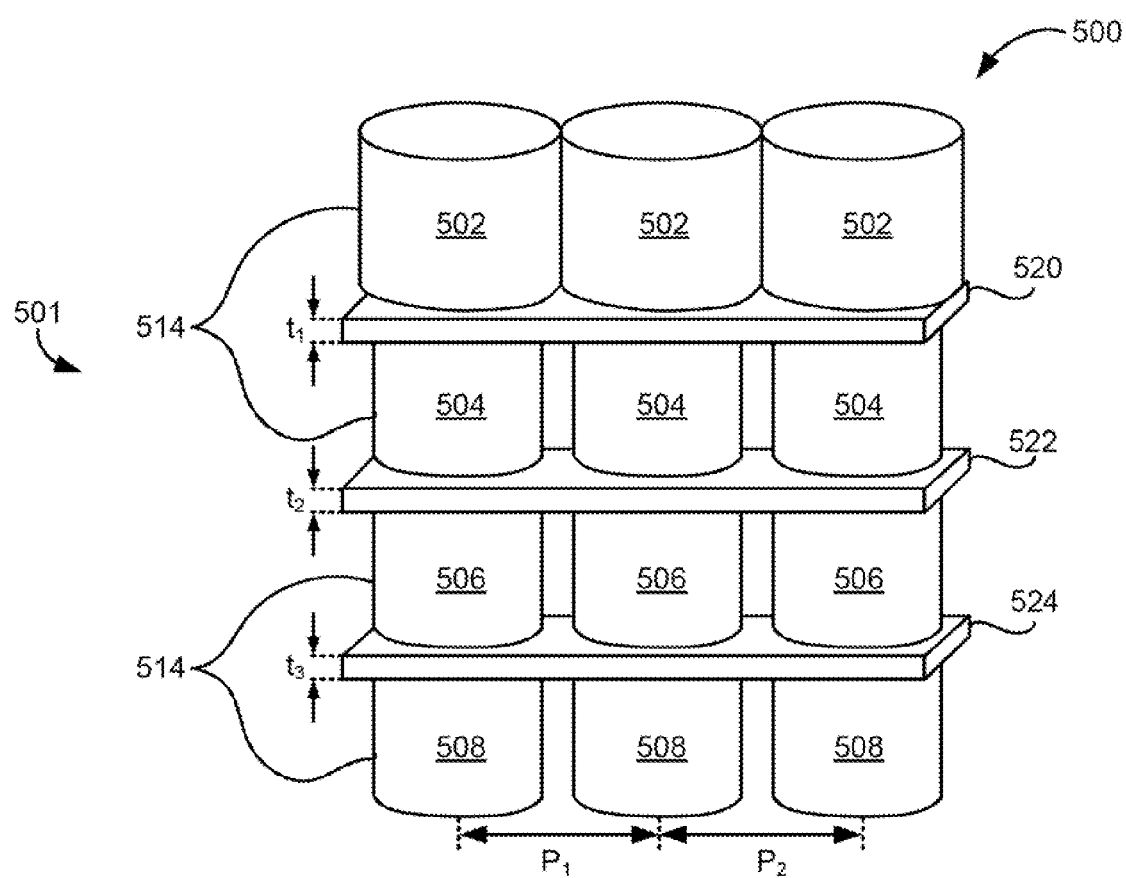
FIG. 5 is a partial side view of a magnetic medium according to one embodiment.

FIG. 5 depicts a portion of a magnetic medium 500, in accordance with one embodiment. As an option, the present magnetic medium 500 may be implemented in conjunction with features from any other embodiment listed herein, such as those described with reference to the other FIGS. Of course, however, such magnetic medium 500 and others presented herein may be used in various applications and/or in permutations which may or may not be specifically described in the illustrative embodiments listed herein. Further, the magnetic medium 500 presented herein may be used in any desired environment.

Referring now to FIG. 5 the magnetic medium 500 includes a recording layer 501 having four magnetic layers 502, 504, 506, 508 and three exchange control layers 520, 522, 524 sandwiched therebetween. Although the recording layer 501 is shown as having four magnetic layers 502, 504, 506, 508 and three exchange control layers 520, 522, 524, in other embodiments, there may be at least three, four, multiple, etc. of the respective layers. Moreover, each of the exchange control layers 520, 522, 524 may have a different effect on the recording layer 501 as a whole. For example, the lowermost exchange control layer 524 may improve the writability of the magnetic medium 500, e.g., by separating the lowermost magnetic layer 508 (having a high magnetic anisotropy (Ku) value) from magnetic layer 506 (having a lower Ku value). Furthermore, according to another example, the uppermost exchange control layer 520 may assist in adjusting the pinning field for the cap layer 502, e.g., thereby affecting the magnetic exchange between the grains 514 and/or layers thereof.

The magnetic medium 500 may further include layers (not shown) of conventional construction that complement the recording layer 501.

According to one approach, each of the four magnetic layers 502, 504, 506, 508 may be separated from one another by the exchange control layers 520, 522, 524 as illustrated. Furthermore, in some approaches, the uppermost magnetic layer 502 may be a cap layer, e.g., such that there are no additional magnetic layers above the cap layer. Thus the uppermost magnetic layer 502 may also be referred to herein as a cap layer 502.

According to preferred embodiments, the exchange control layers 520, 522, 524 may desirably reduce the inter-layer exchange, e.g., vertical exchange, coupling between the magnetic grains 514 of the magnetic layers 502, 504, 506, 508. Preferably, one or more of the exchange control layers 520, 522, 524 may have a magnetic moment less than about 100 emu/cc to assist in such reduction of inter-layer exchange coupling.

In various approaches, the deposition thickness of at least one (e.g., one, two or all) of the exchange control layers 520, 522, 524 are preferably about 80% to about 120% of an average grain boundary thickness in one or more of the magnetic layers directly adjacent to at least one of the exchange coupling layers 520, 522, 524. Thus, depending on the desired embodiment, a deposition thickness $t_1$, $t_2$, $t_3$ of one or more of the exchange coupling layers 520, 522, 524 respectively, may be between about 2 Å and about 25 Å, more preferably from about 5 Å to about 20 Å, but could be higher or lower, depending on the desired embodiment. It should be noted that, as used herein, the term "about" with reference to some stated value refers to the stated value±10% of said value.

By incorporating exchange control layers 520, 522, 524 having deposition thicknesses in the preferred aforementioned ranges, although the exchange control layers 520, 522, 524 are positioned between the magnetic layers 502, 504, 506, 508, the exchange control layers 520, 522, 524 do not disturb the growth of the magnetic layers 502, 504, 506, 508, e.g., during formation of the magnetic grains 514. The exchange control layers 520, 522, 524 are preferably formed epitaxially over each of the respective magnetic layers 502, 504, 506, 508, e.g., in a continual growth fashion. This preferably allows for an epitaxial growth for the magnetic grains 514 as a whole, e.g., from the lowermost magnetic layer 508 through the cap layer 502. Thus, the epitaxial growth of the exchange control layers 520, 522, 524 and/or the magnetic layers 502, 504, 506, 508 desirably reduces the horizontal coupling between adjacent and/or nearby magnetic grains within the recording layer 501.

Furthermore, each of the magnetic layers 502, 504, 506, 508 may have a unique Ku value according to different approaches. In an illustrative approach, the lowermost of the magnetic layers 508 may have a highest Ku value relative to the other magnetic layers 502, 504, 506. In a preferred approach, the Ku value of each of the other magnetic layers 502, 504, 506 is preferably less than the Ku value of the magnetic layer immediately therebelow. For example, which is in no way intended to limit the invention, the Ku value of the cap layer 502 is preferably lower than the Ku value of the magnetic layer 504 immediately therebelow.

The grading of Ku values in this approach may improve writability of the magnetic medium 500. By incorporating increasingly higher Ku values moving from the upper magnetic layers, e.g. 502, towards the lower magnetic layers, e.g. 508, propagating a write operation to the magnetic medium 500 may be accomplished by a magnetic read/write portion (e.g. see 121 of FIG. 1) applying a magnetic field that is weaker than conventionally required. In other words, the graded Ku values allow for the magnetic layers 502, 504, 506, 508 to be weakly magnetically coupled, e.g., such that a magnetic field applied to the uppermost of the magnetic layers 502 is easily transferred to the magnetic layers therebelow. As a result, data may be written more accurately without threatening the integrity of data stored on adjacent and/or nearby magnetic grains within the magnetic medium.

According to an illustrative approach, the lowermost magnetic layer 508 may have a Ku value of about $1.1 \times 10^7$ emu/cc while magnetic layers 504, 506 may have a Ku value of about $4.8 \times 10^6$ emu/cc and $5.2 \times 10^6$ emu/cc respectively. Moreover, the uppermost magnetic layer 502 (e.g., the cap layer 502) may have a Ku value of about $1 \times 10^6$ emu/cc, but could be higher or lower, depending on the desired embodiment.

With continued reference to FIG. 5, the center to center pitch $P_1$, $P_2$ of the magnetic grains 514 respectively, may be measured in a lowermost magnetic layer 508 thereof. Each of the magnetic layers below the cap layer 502 preferably have a similar and/or the same pitch, e.g., within tolerances. According to some approaches, the similar and/or same pitch of each of the magnetic layers of the magnetic grains 514 may be due, at least in pan, to the conformal growth on the lowermost magnetic layer 508, as will be described in detail below.

According to different embodiments, the cap layer 502, one or more of the magnetic layers 504, 506, 508, and/or one or more of the exchange control layers 520, 522, 524 may include oxygen. By adding oxygen and/or oxides to any and/or all of the aforementioned layers, the inter-granular exchange, e.g., horizontal exchange, between the magnetic grains 514 of the recording layer 501 may be desirably reduced. In various approaches, this may be a result of the oxides in the layers segregating out, e.g., during formation of the magnetic medium, and forming larger boundaries between each of the magnetic grains than conventionally achievable. It should further be noted that reductions made to the horizontal exchange between magnetic grains are preferably balanced with reductions made to the vertical exchange between layers of the magnetic grains, e.g., to ensure magnetic stability of the recording layer.

Figure 9A:
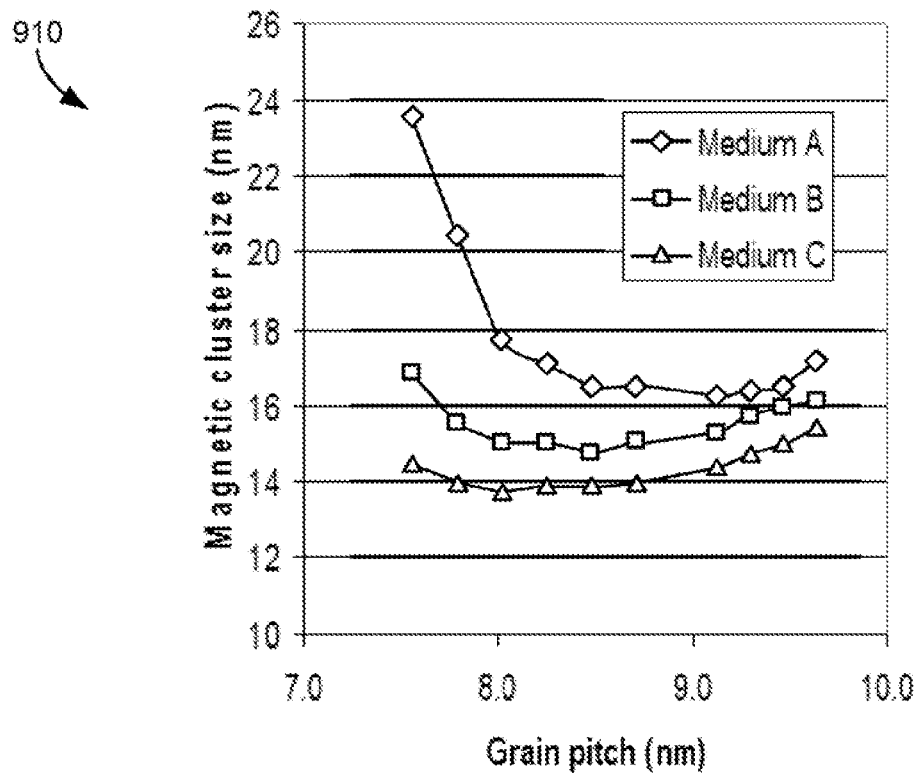
FIG. 9A is a comparative graph plotting grain pitch vs. magnetic cluster size according to several embodiments.
Figure 9B:
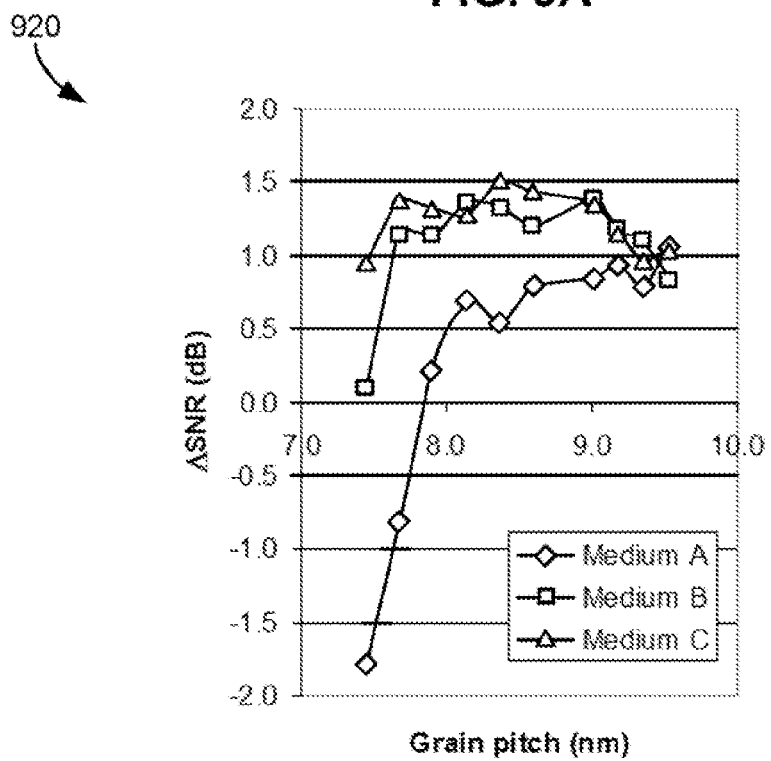
FIG. 9B is a comparative graph plotting grain pitch vs. signal to noise ratio according to several embodiments.
Figure 9C:
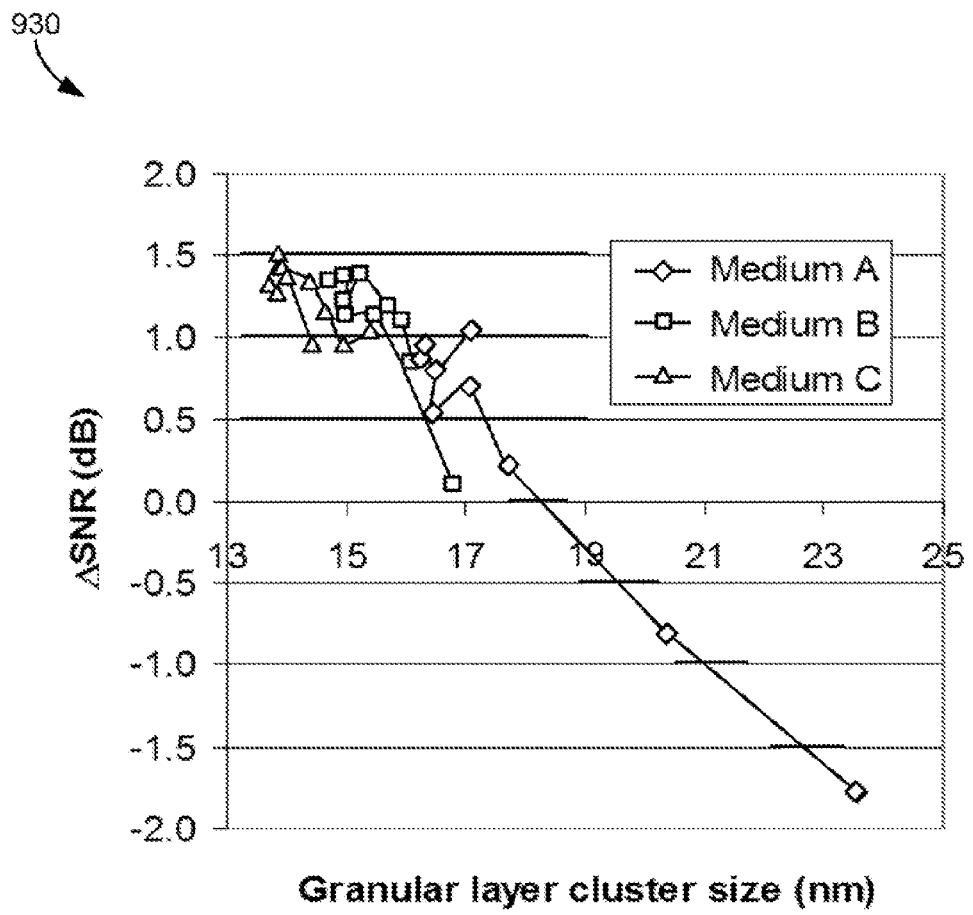
FIG. 9C is a comparative graph plotting cluster size vs. signal to noise ratio according to several embodiments.

FIGS. 9A-9C depicts graphs 910, 920, 930 respectively, in accordance with several embodiments. Looking to each of the graphs, Mediums A, B and C represent magnetic media containing alloys doped with differing oxide levels. For experimentation, the magnetic media were doped such that Medium A had the lowest oxide content, Medium B had a greater oxide content that Medium A, and Medium C had the highest oxide content (e.g., between about 25 vol % and about 30 vol %) of the three magnetic media.

Looking to FIG. 9A, the graph 910 illustrates the relationship between the grain pitch of a given magnetic medium and the corresponding magnetic cluster size, depending on the embodiment. The graph 910 shows that Medium C, having the highest oxide content of the magnetic media tested, has a smaller cluster size than the other magnetic media, irrespective of the center to center grain pitch. Thus, by increasing the oxide content in a doped magnetic medium, both the grain pitch and cluster size may be desirably reduced, thereby improving write accuracy, storage density, etc. of the magnetic medium, etc.

FIGS. 9B-9C provide further illustrations in support of the advantages of magnetic media doped with higher oxide contents, e.g., in terms of signal to noise ratios, as will soon become apparent. Looking now to FIG. 9B, the graph 920 illustrates the signal to noise ratio (SNR) of Medium C as being higher than that of Mediums A and B which have lower oxide contents. This becomes particularly apparent for the lower grain pitch values.

Similarly, graph 930 of FIG. 9C depicts the signal to noise ratio (SNR) of Medium C as being higher than that of Mediums A and B with respect to different cluster size values. Again, this is particularly apparent for lower cluster size values, e.g., at about 15 nm or smaller.

Referring again to FIG. 5, the center to center pitch of the magnetic grains 514 may be reduced, while preserving functionality of the magnetic medium 500 as a whole, e.g., such that the spacing between the magnetic grains 514 is much smaller than achievable in conventional products. In preferred embodiments, an average center to center pitch P1, P2 of the magnetic grains 514 in a lowermost of the magnetic layers 508 shown in FIG. 5 may be about 9 nm or less, preferably from about 8 nm to about 9 nm, but may be higher or lower depending on the desired embodiment.

Figure 8:
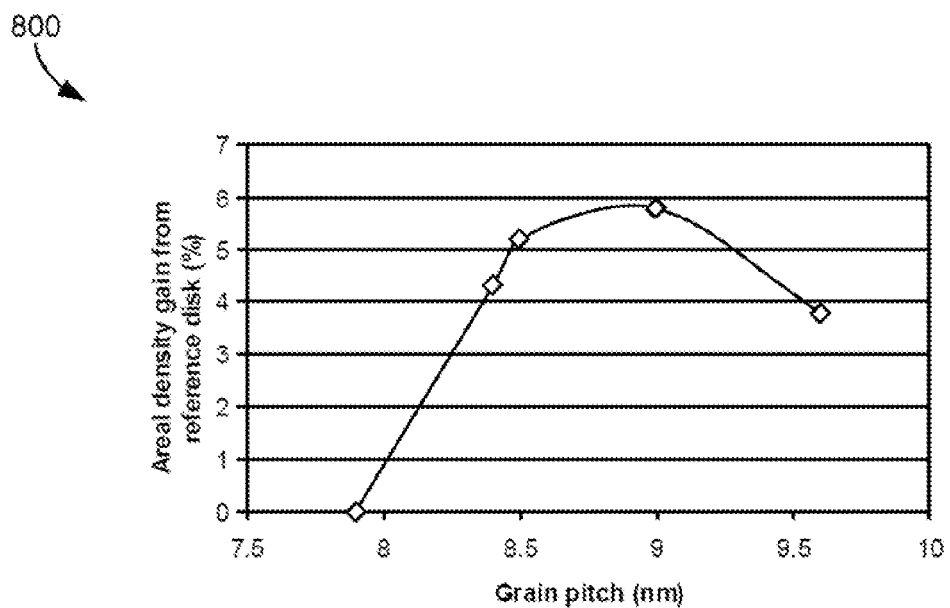
FIG. 8 is a graph plotting grain pitch vs. areal density gain from a reference disk according to one embodiment.

Looking to FIG. 8, the graph 800 illustrates the areal density improvements of an exemplary magnetic medium, e.g., similar to the magnetic medium 500 depicted in FIG. 5, over a conventional magnetic disk design having unfavorable strong coupling between grains and/or layers thereof. As shown, grain pitch values of about 8 nm to about 9 nm achieve an improved areal density gain over what was conventionally achievable.

The measurements were conducted using a Singled Magnetic Recording (SMR) scheme. Furthermore, referring again to FIG. 5, by reducing the inter-granular exchange and/or horizontal exchange between the grains of the recording layer 501, the effective magnetic cluster size may be reduced as well, thereby increasing data storage density. According to different approaches, the magnetic cluster size of the recording layer 501 may be less than about 30 nm, but could be higher or lower depending on the desired embodiment.

According to one approach, the lowermost magnetic layer 508 may have an oxide content of at least 20 vol %, but could be higher or lower depending on the desired embodiment. In various other approaches, any one or more of the magnetic layers 504, 506, 508 may include a doped alloy material, such as (CoCrPt)X+Y, (CoPt)X+Y, (CoCr)X+Y, etc. According to different approaches, X may include one or more of, e.g., B, W, Ru, Ta, etc. Moreover, Y may include one or more of $SiO_2$, $Ta_2O_3$, $TiO_2$, CoO, $Co_2O_3$, $Cr_2O_3$, etc. and/or other conventional oxides, depending on the desired embodiment. Moreover, it should be noted that any combination of X and/or Y may be used in various embodiments to form the desired doped alloy material, based on the description above.

According to other approaches, at least one of the exchange control layers 520, 522, 524 may have an oxygen content of greater than 0 vol %. Thus, according to various approaches, one, two, or all of the exchange control layers 520, 522, 524 may be doped with oxygen and/or an oxide. However, depending on the desired embodiment, one or more of the exchange control layers 520, 522, 524 may include Co, Cr, Ru, oxygen, etc., and/or any other nonmagnetic material.

In various approaches, the exchange control layers 522, 524 may include a doped alloy material, e.g., such as (CoCrRu)X+Y, (CoRu)X+Y, (Ru)X+Y, etc. According to different approaches, X may include Pt, B, etc. Moreover, Y may include $SiO_2$, $Ta_2O_3$, CoO, $Co_2O_3$, $Cr_2O_3$, etc., depending on the desired embodiment. It should also be noted that any combination of X and/or Y may be used in various embodiments to form the desired doped alloy material, based on the description above.

However, according to another approach, the cap layer 502 may be doped with oxygen, e.g., in order to reduce inter-granular exchange and/or horizontal exchange between the grains. In some embodiments, the cap layer 502 may be deposited in a partial oxygen atmosphere, but is not limited thereto. Moreover, according to different approaches, the oxygen content of the cap layer 502 may be in a range from about 0.5 vol % to about 30 vol %.

Depending on the desired embodiment, the cap layer 502 may include a doped alloy material, e.g., such as (CoCrPt)X, (CoCrPt)X+Y, (CoCr)X+Y, (CoPt)X+Y, etc. According to different approaches, X may include B, W, Ru, Ta, O, etc. Moreover. Y may include $SiO_2$, $Ta_2O_3$, $TiO_2$, CoO, $Co_2O_3$, $Cr_2O_3$, etc. It should be noted that in various embodiments, any combination of X and/or Y may be used to form the desired doped alloy material, based on the description above.

As mentioned above, it is preferable that each of the magnetic layers (504, 506, 508) below the cap layer 502 have a similar center to center pitch, e.g., due to the conformal growth on the lowermost magnetic layer 508. Thus, the grain boundaries (e.g., the space between each of the magnetic grains 514) in each magnetic layer 502, 504, 506, 508 are generally aligned vertically along the recording layer 501.

Through testing, the inventors were able to achieve grain boundaries which extended vertically from a lowermost of the magnetic layers (e.g., 508) to the cap layer (e.g., 502). As described above, this epitaxial growth of the magnetic grain layers is desirable in that it reduces the horizontal coupling between adjacent and/or nearby magnetic grains within the recording layer 501. Thus the grain pitch may be decreased without compromising magnetic stability of the grains (e.g., data integrity), while also desirably increasing the storage density of the magnetic medium 500.

The foregoing beneficial results were not predictable, and it was unknown whether the foregoing approaches would result in an improvement over existing designs. However, the inventors were pleased to find that approaches implementing the reduction in vertical coupling, approaches implementing the reduction in horizontal coupling, and approaches implementing both did indeed provide an improvement in terms of cluster size over prior attempts to reduce grain size.

Figure 6:
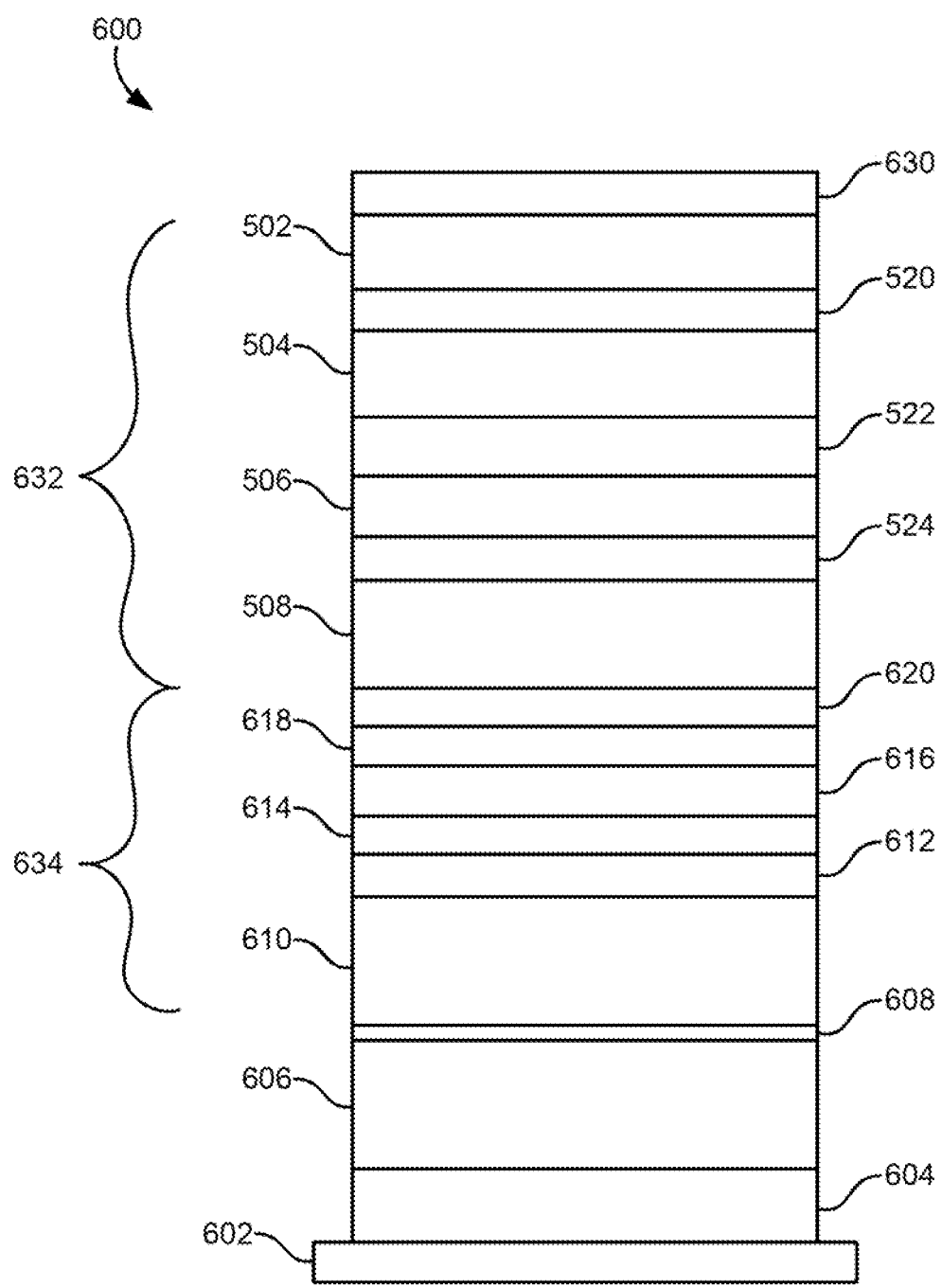
FIG. 6 is a partial side view of a magnetic medium according to one embodiment.

FIG. 6 depicts a magnetic medium 600 according to an exemplary embodiment, which is in no way intended to limit the invention. As an option, the present medium 600 may be implemented in conjunction with features from any other embodiment listed herein, such as those described with reference to the other FIGS. Of course, however, such medium 600 and others presented herein may be used in various applications and/or in permutations which may or may not be specifically described in the illustrative embodiments listed herein. Further, the medium 600 presented herein may be used in any desired environment.

The magnetic medium 600 includes a seed layer 604, e.g., NiTa, above a glass substrate layer 602. Above seed layer 604 there may be soft under layers 606, 610, which are illustrated as being separated by a thin Ru layer 608. According to different approaches, the seed layer 604 may have a preferred thickness of about 33 nm and the soft under layers 606,610 may have a preferred thickness of about 15 nm, but either may be higher or lower depending on the desired embodiment.

The magnetic medium 600 further includes a NiCrW layer 612, having a preferred thickness of about 5.8 nm. Above layer 612, three Ru layers 614, 616, 618 are included, each of which may incorporate the same, similar or different dimensions according to different approaches. In other approaches, layers 614, 616, 618 may include other non-magnetic materials as would be appreciate by one skilled in the art upon reading the present description. Furthermore, above the Ru layers, 614, 616, 618, a RuTi—TiO$_2$ onset layer 620 may also be added.

With continued reference to FIG. 6, the layers 610, 612, 614, 616, 618, 620 may form a seed layer 634 in one approach. Furthermore, the magnetic medium 600 includes a recording layer 632 and a protective layer 630, above the RuTi—TiO$_2$ onset layer 620. In some approaches, the onset layer 620 may serve as an exchange break layer, but is in no way limited thereto.

In preferred embodiments, the recording layer 632 may be similar or the same to that of the recording layer 501 of FIG. 5, but is not limited thereto.

Looking to the recording layer 632, the recording layer 632 may include a magnetic layer 508, exchange control layer 524, magnetic layer 506, exchange control layer 522, magnetic layer 504, exchange control layer 520, and cap layer 502. According to an exemplary approach, which is in no way intended to limit the invention, illustrative thicknesses of the layers of the recording layer 632 may be as follows: the magnetic layer 508 may be about 4.7 nm, the exchange control layer 524 may be about 0.7 nm, the magnetic layer 506 may be about 3.5 nm, the exchange control layer 522 may be about 0.7 nm, the magnetic layer 504 may be about 2.1 nm, the exchange control layer 520 may be about 0.7 nm, and the cap layer 502 may be about 3.1 nm. However, in different approaches, each of the aforementioned thicknesses of the layers composing the recording layer 632 may be higher or lower, depending on the preferred embodiment.

Figure 7:
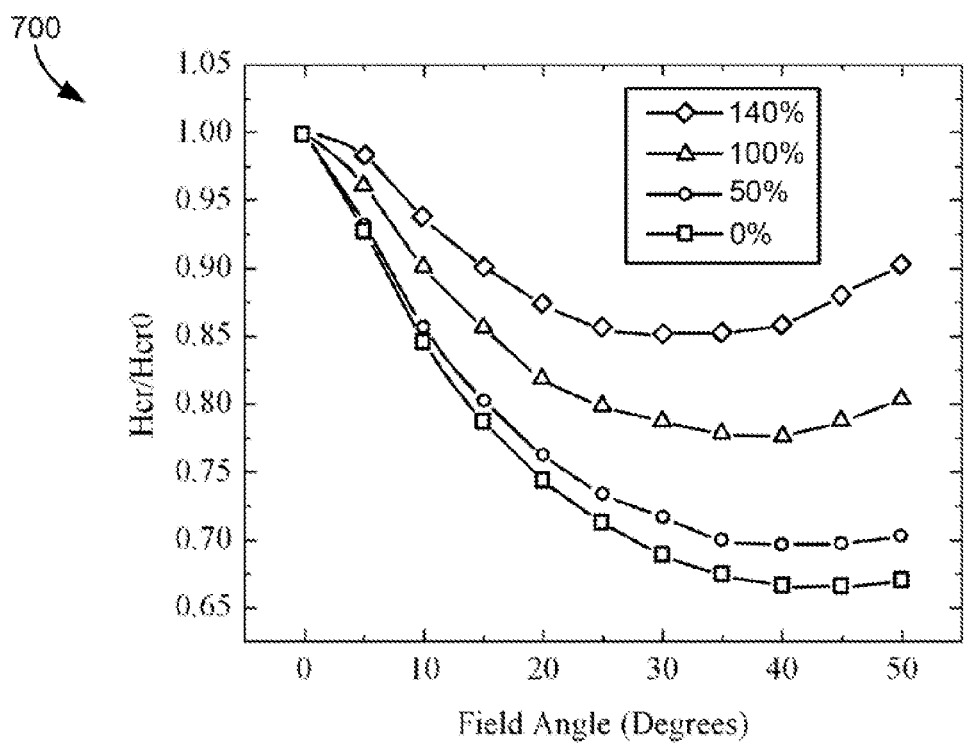
FIG. 7 is a comparative graph plotting the field angle vs. a normalized coercivity value according to several embodiments.

With reference now to FIG. 7, the graph 700 illustrates the relationship between the field angle applied to a given medium and the resulting normalized coercivity value, depending on the embodiment. As illustrated, the data relates to four different designs, each having a different deposition thickness for the exchange coupling layers thereof, e.g., see 520, 522, 524 of FIG. 5. The graph 700 of FIG. 7 includes data for exchange coupling layers having about uniform deposition thicknesses of about 1.4 nm (140%), about 1 nm (100%), 0.5 nm (50%), and 0 nm (0%), e.g., failing to have exchange coupling layers at all.

Looking to the graph 700, as the thickness of the exchange coupling layers increases, the corresponding data curves dip shallower along the vertical axis. Thus, the inventors have found that magnetic media having exchange coupling layers with a thickness of about 1 nm or higher, are relatively insensitive to the field angle applied thereto.

According to preferred embodiments, a minimum value of angular dependence of Hcr of a magnetic medium may be greater than 75% of the Hcr of the magnetic medium as measured when an external magnetic field is applied thereto in a perpendicular direction relative to a plane of deposition of the medium, i.e., at a field angle of 0 degrees from perpendicular. Looking again to the graph 700, the minimum value of angular dependence corresponds to about a 45 degree incidence of an external magnetic field.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification. According to an illustrative embodiment, which is in no way intended to limit the invention, any of the approaches described and/or suggested herein may be implemented in heat and/or microwave assisted magnetic recording system.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic medium, comprising:
a recording layer comprising at least three exchange control layers each having a magnetic moment less than 100 emu/cc, and four magnetic layers separated from one another by the exchange control layers,
wherein an uppermost of the magnetic layers is doped with oxygen,
wherein a magnetic cluster size of the recording layer is less than about 30 nm, wherein at least one of the exchange control layers comprises Co, Cr, Ru and oxygen.

2. A magnetic medium, comprising:
a recording layer comprising at least three exchange control layers each having a magnetic moment less than 100 emu/cc, and four magnetic layers separated from one another by the exchange control layers,
wherein an uppermost of the magnetic layers is doped with oxygen,
wherein a magnetic cluster size of the recording layer is less than about 30 nm,
wherein a lowermost of the magnetic layers has a highest Ku value relative to the other magnetic layers, wherein a Ku value of each of the other magnetic layers is less than the Ku value of the magnetic layer immediately therebelow.

3. The magnetic medium as recited in claim 2, wherein an average pitch of magnetic grains in a lowermost of the magnetic layers is 9 nm or less.

4. The magnetic medium as recited in claim 2, wherein a lowermost of the magnetic layers has an oxide content of at least 20 vol %.

5. The magnetic medium as recited in claim 2, wherein the Ku value of the lowermost of the magnetic layers is about $1.1 \times 10^7$ emu/cc.

6. The magnetic medium as recited in claim 2, wherein an oxygen content of an uppermost of the magnetic layers is in a range of about 0.5 to about 30 vol %.

7. The magnetic medium as recited in claim 2, wherein grain boundaries in the magnetic layers are generally aligned vertically along the recording layer from a lowermost of the magnetic layers to an uppermost of the magnetic layers.

8. The magnetic medium as recited in claim 2, wherein a deposition thickness of each of the exchange control layers is between about 5 and about 20 angstroms.

9. The magnetic medium as recited in claim 2, wherein at least one of the exchange control layers has an oxygen content of greater than 0 vol %.

10. The magnetic medium as recited in claim 2, wherein a minimum value of angular dependence of Hcr of the magnetic medium is greater than 75% of the Hcr of the magnetic medium as measured when an external magnetic field is applied thereto in a perpendicular direction.

11. The magnetic medium as recited in claim 2, wherein a deposition thickness of at least one of the exchange control layers is about 80% to about 120% of an average grain boundary thickness in one or more of the magnetic layers adjacent to the at least one exchange control layer.

12. A magnetic data storage system, comprising:
at least one magnetic head;
a magnetic medium as recited in claim 2;
a drive mechanism for passing the magnetic medium over the at least one magnetic head; and
a controller electrically coupled to the at least one magnetic head for controlling operation of the at least one magnetic head.

13. A magnetic medium, comprising:
a recording layer comprising at least three exchange control layers and four magnetic layers separated from one another by the exchange control layers; and
an onset layer positioned immediately below the recording layer, the onset layer comprising Ru, Ti, and $TiO_2$,
wherein an uppermost of the magnetic layers has an oxygen content of greater than 0.5 vol %,
wherein an average pitch of magnetic grains in a lowermost of the magnetic layers is 9 nm or less,
wherein a lowermost of the magnetic layers has an oxide content of at least 20 vol %,
wherein a magnetic cluster size of the recording layer is less than about 30 nm.

14. The magnetic medium as recited in claim 13, wherein a lowermost of the magnetic layers has a highest Ku value relative to the other magnetic layers, wherein a Ku value of each of the other magnetic layers is less than the Ku value of the magnetic layer immediately therebelow, wherein the Ku value of the lowermost of the magnetic layers is about $1.1 \times 10^7$ emu/c.

15. The magnetic medium as recited in claim 14, wherein an uppermost of the magnetic layers is a cap layer, wherein the Ku value of an uppermost of the magnetic layers is about $1 \times 10^6$ emu/cc.

16. The magnetic medium as recited in claim 15, wherein grain boundaries in the magnetic layers are generally aligned vertically along the recording layer from a lowermost of the magnetic layers to the cap layer.

17. The magnetic medium as recited in claim 13, wherein a deposition thickness of each of the exchange control layers is between about 5 and about 20 angstroms, and wherein each of the exchange control layers has an oxygen content of greater than 0 vol %.

18. The magnetic medium as recited in claim 13, wherein a minimum value of angular dependence of Hcr of the magnetic medium is greater than 75% of the Hcr of the magnetic medium as measured when an external magnetic field is applied thereto in a perpendicular direction.

19. The magnetic medium as recited in claim 13, wherein a deposition thickness of each of the exchange control layers is about 80% to about 120% of an average grain boundary thickness in one or more the magnetic layers adjacent to the respective exchange control layer.

20. A magnetic data storage system, comprising:
at least one magnetic head;
a magnetic medium as recited in claim 13;
a drive mechanism for passing the magnetic medium over the at least one magnetic head; and
a controller electrically coupled to the at least one magnetic head for controlling operation of the at least one magnetic head.

21. The magnetic medium as recited in claim 15, wherein the Ku value of the magnetic layer immediately above the lowermost of the magnetic layers is about $5.2 \times 10^6$ emu/cc, and wherein the Ku value of the magnetic layer immediately below the uppermost of the magnetic layers is about $4.8 \times 10^6$ emu/cc.

* * * * *